(12) United States Patent
Gordon et al.

(10) Patent No.: US 6,510,554 B1
(45) Date of Patent: Jan. 21, 2003

(54) METHOD FOR GENERATING INFORMATION SUB-STREAMS FOR FF/REW APPLICATIONS

(75) Inventors: Donald F. Gordon, Pacific Grove, CA (US); Mark D. Conover, Cupertino, CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/067,427

(22) Filed: Apr. 27, 1998

(51) Int. Cl.[7] .......................... H04N 5/917; H04N 7/52; H04N 7/26
(52) U.S. Cl. ................ 725/90; 725/102; 348/384.1; 386/1; 386/5; 386/27; 386/68; 375/240.25
(58) Field of Search ............... 725/88–91, 131–150; 375/240.25, 240.26; 348/425.1, 385.1; 386/68, 5–8, 27, 109–130

(56) References Cited

U.S. PATENT DOCUMENTS

| | | | | |
|---|---|---|---|---|
| 4,496,995 A | * | 1/1985 | Colles et al. ................. 386/68 |
| 4,939,587 A | * | 7/1990 | Deslypper .................... 386/126 |
| 5,717,816 A | * | 2/1998 | Boyce et al. ................. 386/111 |
| 5,841,472 A | * | 11/1998 | Rim et al. .................... 348/390 |
| 5,881,202 A | * | 3/1999 | Herz ........................... 386/68 |
| 6,377,748 B1 | * | 4/2002 | Schultz et al. ............... 386/124 |

* cited by examiner

Primary Examiner—Bhavesh Mehta
Assistant Examiner—Reuben M. Brown
(74) Attorney, Agent, or Firm—Moser, Patterson & Sheridan, LLP

(57) ABSTRACT

A method and apparatus for processing an information stream comprising a plurality of compressed information frames to produce an information sub-stream having a reduced number of information frames. In the case of an MPEG video information stream, the information sub-stream is suitable for use as a fast-forward (FF) or rewind (REW) stream in, e.g., a video on demand (VOD) system utilizing such streams.

20 Claims, 3 Drawing Sheets

METHOD FOR GENERATING INFORMATION SUB-STREAMS FOR FF/REW APPLICATIONS

The invention relates to information distribution systems and, more particularly, the invention relates to a method of generating information sub-streams for use in information distribution systems.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Information distribution systems utilizing information streams conforming to the above standards or subsets of the above standards are known. For example, an interactive digital video on demand (VOD) service known as the OnSet™ system is manufactured by DIVA Systems Corporation of Menlo Park, Calif. The OnSet™ system distributes audio-visual information to individual subscribers utilizing MPEG-like information streams. The OnSet™ system also allows subscribers to interactively control the delivery of audio-visual information using consumer-friendly commands, such as fast-forward (FF), rewind (REW), pause (PAUSE), play (PLAY) and the like.

The OnSet™ system utilizes additional information streams to provide FF and REW functionality to subscribers. Specifically, the OnSet™ system utilizes a main information stream to carry a desired audio-visual program. Additionally, the OnSet™ system utilizes first and second information sub-streams for carrying respective FF and REW versions of at least the video portion of the desired audio-visual program. The FF and REW streams associated with an audio-visual program are accessible to a subscriber along with the audio-visual program. By activating a FF or REW mode of operation, the subscriber's set top terminal will begin decoding, respectively, the FF or REW stream. In this manner, the OnSet™ system provides FF and REW control features to a subscriber.

One technique for providing FF or REW capability to a subscriber is to simply increase the bandwidth allocation of a channel providing a program to the subscriber. This technique disadvantageously increases the cost of delivering the program to the subscriber by inefficiently using the available bandwidth and by forcing the subscriber's equipment to perform a FF or REW frame selection process. Thus, to reduce subscriber-side processing requirements, it is desirable to process program material at the server side to generate frame-reduced (i.e., temporally decimated) information streams suitable for use as FF or REW streams.

A typical technique for generating FF and REW streams comprises decoding an MPEG or MPEG-like video information stream to produce an uncompressed, baseband format video signal, such as a composite or component video signal. The baseband format video signal is then coupled to a frame or field counter which identifies every Nth video frame (or pair of fields) by, e.g., counting the number of horizontal or vertical synchronization pulses in the signal. Each Nth video frame (or pair of fields) is then encoded in an MPEG-like manner and stored on a video server for subsequent delivery to a subscriber. Unfortunately, this technique for generating FF and REW streams is very slow and computationally intensive.

A real-time FF display technique comprises decoding, at a subscriber's decoder, only non-predicted video frames (i.e., only intra-frame encoded video frames) within a main video information stream. That is, the decoder processes an MPEG or MPEG-like video information stream by ignoring all forward-predictive coded video frames (i.e., P-frames) and bi-directionally-predictive coded video frames (i.e., B-frames). The resulting decoded video stream will comprise only those video frames associated with intra-coded video frames (i.e., I-frames). Thus, in the case of an MPEG or MPEG-like video information stream having, e.g., a repeating 15 frame group of picture (GOP) format including one I-frame, the resulting processed video stream will include only one fifteenth of the video frames associated with the original, unprocessed MPEG or MPEG-like video information stream. Unfortunately, in the case of a variable GOP structure, or in the case of a GOP structure allowing for a large number of non-I-frame video frames, this processing technique provides unsatisfactory results. Specifically, in these two cases, this real-time subscriber-side processing technique provides a resulting processed stream containing too little video information or providing a "jerky" FF or REW display.

Therefore, a need exists in the art for a rapid and computationally efficient method for generating FF and REW streams in particular, and information sub-streams in general, that addresses the problems associated with the above-described techniques.

SUMMARY OF THE INVENTION

The invention is a method for processing an information stream comprising a plurality of compressed information frames to produce an information sub-stream having a reduced number of information frames.

Specifically, a method for processing a compressed information stream to produce one or more compressed information sub-streams comprises the steps of: (a) decoding a sub-sample of the compressed information stream to produce an uncompressed information sub-stream; (b) storing, in a memory, the uncompressed information sub-stream; (c) retrieving, from the memory, the stored uncompressed information sub-stream; and (d) encoding, using a compression encoder, the retrieved uncompressed information frames to produce an encoded information sub-stream.

In another embodiment, the above method includes several modes of operation: in a fast-forward (FF) mode of operation, the stored uncompressed information sub-stream is retrieved in a standard temporal order and encoded to produce an encoded FF information sub-stream; and in a fast-rewind (REW) mode of operation, the stored uncompressed information sub-stream is retrieved in a reverse temporal order and encoded to produce an encoded REW information sub-stream.

In another embodiment, the above method includes the step of storing, in the fast-forward (FF) mode of operation and the fast-rewind (REW) mode of operation, respectively, the encoded FF information sub-stream and the encoded REW information sub-stream in a mass storage unit.

In yet another embodiment of the above method, the compressed information stream comprises a plurality of compressed information frames, and the step of decoding a sub-sample of the compressed information stream comprises the steps of: (1) identifying an Nth compressed information frame in the compressed information stream, where N is an integer; (2) decoding the identified Nth compressed information frame to produce an uncompressed information frame; and (3) repeating steps (1) and (2) until each of the Nth compressed information frames in the compressed information stream has been processed.

In still another embodiment of the above method, the step of identifying further comprises the steps of: determining if the identified information frame is a non-predicted information frame or a predicted information frame; and in the case of the identified information frame being a predicted information frame of a first type: examining each of up to M compressed information frames subsequent or prior to the identified information frame to identify a one compressed information frame that is not a predicted information frame of the first type, where M is an integer; and substituting, for decoding purposes, the identified one information frame for the identified information frame.

An apparatus according to the invention for processing an information stream to produce an information sub-stream comprises a decoder, for decoding the information frames coupled to the frame controller output and producing a frame-decoded information stream therefrom; and the decoder further comprises a parser, for examining a header portion of at least every Nth compressed information frame in the information stream, and for generating an indicium of a compression type associated with the examined frame; and a frame controller, coupled to the parser, for causing the decoding of every Nth information frame if the Nth information frame is of a desired compression type, where N is an integer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
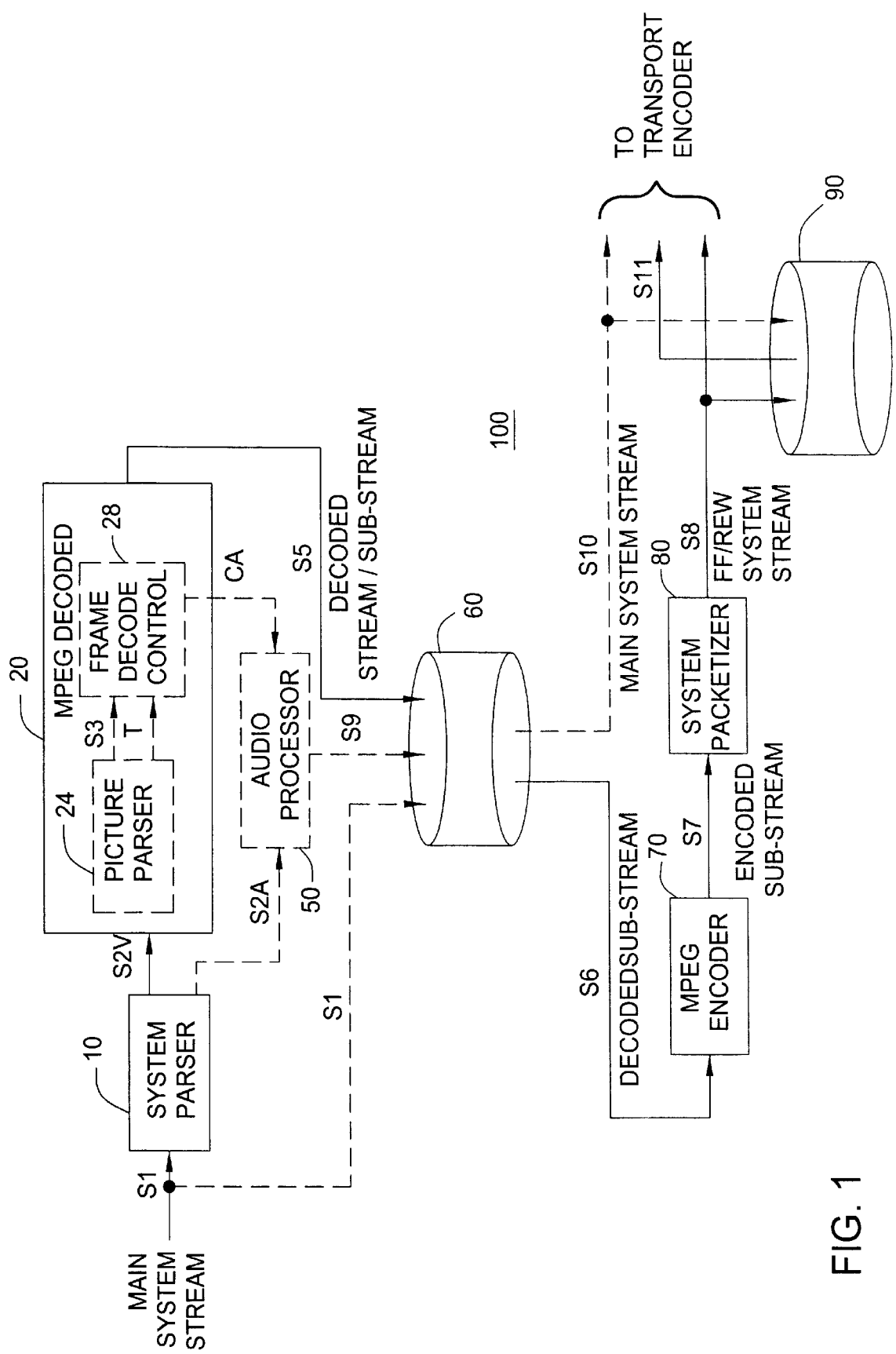
FIG. 1 shows a block diagram of an information stream processing system according to the invention.

FIG. 1 shows a block diagram of a information stream processing system 100 according to the invention. Specifically, the system 100 of FIG. 1 receives, e.g., an MPEG-like system stream S1 comprising, e.g., a plurality of program streams. An "MPEG-like" system stream is a stream encoded using prediction-based encoding such as MPEG-1 or MPEG-2. A system parser 10 parses the MPEG-like system stream S1 to identify a desired program stream. The desired program stream (e.g., a movie, television show or any other audio-visual presentation) comprises a compressed video information stream S2V having an associated compressed audio information stream S2A. The compressed video information stream S2V is coupled to a picture processor 20, illustratively an MPEG decoder. The associated compressed audio information stream S2A is optionally coupled to an audio processor 50.

MPEG decoder 20 decodes the compressed video information stream S2V to produce an uncompressed (i.e., decoded) digital video stream S5, illustratively a source intermediate format (SIF) digital video stream. In a normal mode of operation, the MPEG decoder 20 produces a full-length, uncompressed digital video stream S5 comprising substantially all of the video information included within the compressed video information stream S2V. In either of a fast-forward mode of operation and a rewind mode of operation, the MPEG decoder 20 produces a uncompressed digital video stream S5 comprising a subset of the video information included within the compressed video information stream S2V. The subset may comprise, e.g., every Nth frame of video included within the compressed video information stream S2V. In one embodiment of the invention N is equal to nine. Thus, depending on its mode of operation, the MPEG decoder 20 produces an uncompressed digital video stream or sub-stream S5 comprising, respectively, substantially all or a subset of the video information included within the compressed video information stream S2V.

An uncompressed digital video sub-stream S5 as described above comprises a fast-forward (FF) video stream. Similarly, a FF video stream, when displayed in a temporally reversed manner, comprises a fast-reverse or rewind (REW) video stream. Thus, since the digital video sub-stream S5 comprises only a sub-sample (e.g., every Nth frame) of the original video stream, the digital video sub-stream S5 will produce a FF (or REW) display of the underlying video information when displayed on a display device. The generation of FF and REW streams from the information in the digital sub-stream S5 will be discussed in more detail below with respect to FIGS. 2 and 3.

The uncompressed digital video stream or sub-stream S5 is coupled to a memory unit 60, illustratively a mass storage unit such as a hard disk array or other sufficiently large memory device(s), that stores the uncompressed digital video stream S5. In the exemplary information stream processing system 100 of FIG. 1, memory unit 60 is used to store a normal video stream, a fast forward video sub-stream and a rewind video sub-stream associated with a particular compressed video information stream S2V. The uncompressed digital video stream S5 used to provide a normal stream may be stored in a sequential manner in memory unit 60. Similarly, the uncompressed digital video sub-stream S5 used to provide a fast-forward stream may be stored in a sequential manner in memory unit 60. Finally, the uncompressed digital video sub-stream S5 used to provide a rewind stream may be stored in a reverse sequential manner in memory unit 60.

It must be noted that the fast-forward and rewind video sub-streams comprise essentially the same video information, though temporally mirrored. As such, a single sub-stream may be used to provide both FF and REW sub-streams by storing a single sub-stream in, respectively, both forward and reverse frame order on memory unit 60. This may be accomplished by allocating two areas of memory within memory unit 60 to, respectively, FF and REW sub-streams. As the uncompressed digital video sub-stream S5 is received by the memory unit 60, the sub-stream S5 is stored twice on a frame by frame basis. That is, the sub-stream is stored in a forward temporal frame order in the FF memory allocation and in a reverse temporal frame order in the REW memory allocation.

In situations where memory unit 60 is relatively small, the single sub-stream may be stored once in a manner that delineates video frame boundaries. By accessing the stored sub-stream in a forward or reverse temporal manner, respective FF or REW information streams are produced at the output of memory unit 60.

To provide a fast-forward stream or fast-rewind sub-stream for use in a compressed information delivery system, the uncompressed sub-stream stored in memory unit 60 is retrieved and coupled to an MPEG encoder 70 as information stream S6. The MPEG encoder 70 operates in a standard manner to generate an MPEG-like information sub-stream S7. A system packetizer 80 packetizes the MPEG-like information sub-stream S7 to produce a system stream S8 for subsequent transport encoding and delivery to a subscriber via a transport encoder and communications channel (not shown).

The production of FF and REW sub-streams will be discussed in more detail below with respect to FIGS. 2 and 3. Briefly, to produce a FF sub-stream, the uncompressed sub-stream stored in memory unit 60 is retrieved in a normal (i.e., forward) temporal order and encoded by MPEG encoder 70. To produce a REW sub-stream, the uncompressed sub-stream stored in memory unit 60 is retrieved in a reverse temporal order and encoded by MPEG encoder 70. In situations where memory unit 60 is relatively small, only one substream is stored.

As previously noted, the OnSet™ system provides subscribers with three information streams for a particular audio-visual programs: a main information stream carrying a "normal play" (i.e., non-decimated) audio-visual program, and associated FF and REW streams. A subscriber may switch between the main information stream and the FF (or REW) stream to achieve a FF (or REW) effect. The main, FF and REW streams are typically stored on the same video "server" (e.g., memory unit 60 or mass storage unit 90) and are differentiated by, e.g., respective packet identifiers (PID).

The inventors have determined that a conventional (i.e., analog) video tape recorder (VCR) operating in a fast-forward mode produces an image having an effective frame rate of approximately nine times the normal (i.e., play-mode) frame rate. Thus, to mimic the visual effect of a conventional VCR fast-forward mode of operation the picture processing unit 20 typically uses a value of N equal to nine. The value of N can obviously be modified to vary the effective frame rate to any rate desirable.

Figure 2:
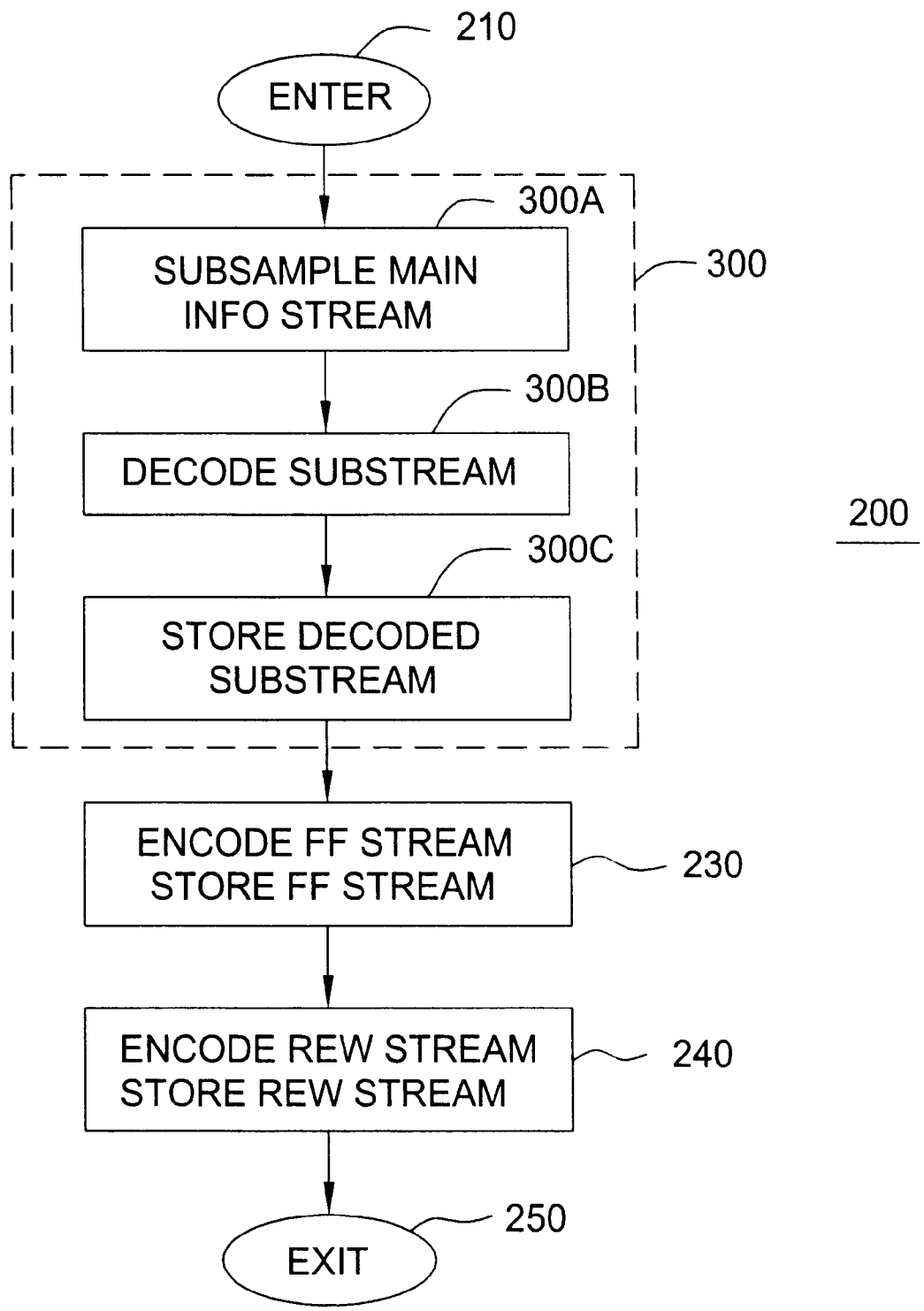
FIG. 2 shows a flow diagram of a process for generating information sub-streams according to the invention and suitable for use in the information stream processing system of FIG. 1.

FIG. 2 shows a flow diagram of a process 200 for generating compressed information sub-streams according to the invention. The generating process 200 is entered at step 210, when a compressed information stream, illustratively compressed video information stream S2V, is received by, illustratively, picture processing unit 20 of the information stream processing system 100 of FIG. 1. The generating process 200 proceeds to step 300A, where the compressed information stream is subsampled or decimated on a frame by frame basis to produce a compressed information sub-stream. The generating process 200 then proceeds to step 300B, where the compressed information sub-stream is decoded to produce an uncompressed information sub-stream, illustratively decoded sub-stream S5. The generating process 200 then proceeds to step 300C, where the decoded sub-stream is stored in, illustratively, memory unit 60. It will be recognized by those skilled in the art that step 300C may be incorporated into step 300 such that the uncompressed information sub-stream is stored in, e.g., memory unit 60 on a frame by frame basis (i.e., store each uncompressed frame as it is decoded). An exemplary method for implementing steps 300A–300C, which together form step 300, will be discussed below with respect to FIG. 3.

After storing the decoded (i.e., uncompressed) information sub-stream (step 300C), the generating process 200 proceeds to step 230. At step 230, the stored uncompressed sub-stream is retrieved in a normal (i.e., forward) temporal frame order from memory as, illustratively, decoded sub-stream S6 and encoded by, illustratively, MPEG encoder 70 to form an encoded fast-forward (FF) sub-stream. The encoded FF sub-stream is then stored in, illustratively, mass storage unit 90.

After storing the encoded FF sub-stream (step 230), the generating process 200 proceeds to step 240. At step 240, the stored uncompressed sub-stream is retrieved in a reverse temporal frame order from memory as, illustratively, decoded sub-stream S6 and encoded by, illustratively, MPEG encoder 70 to form an encoded fast-rewind (REW) sub-stream. The encoded REW sub-stream is then stored in, illustratively, mass storage unit 90. The generating process 200 is exited at step 250.

The above-described sub-stream generating process is utilized to produce MPEG (or MPEG-like) FF and REW sub-streams. These sub-streams are shown as being stored in mass storage unit 90. In the exemplary information stream processing system 100 of FIG. 1, two storage units (60 and 90) are shown. The first memory unit 60 is used primarily as temporary storage for stream S5, the uncompressed stream or sub-stream produced by picture processor 20. The second mass storage unit 90 is used primarily for storage of the (compressed) FF and REW system stream S8. It should be noted that a single mass storage unit may be used to perform all these functions. Moreover, it should be noted that the main system stream (S1 and S10) may be stored on either or both of the two storage units. Finally, the storage units (60 and 90) may produce respective output streams (S10 and S11) that are coupled to the transport encoder (not shown).

Figure 3:
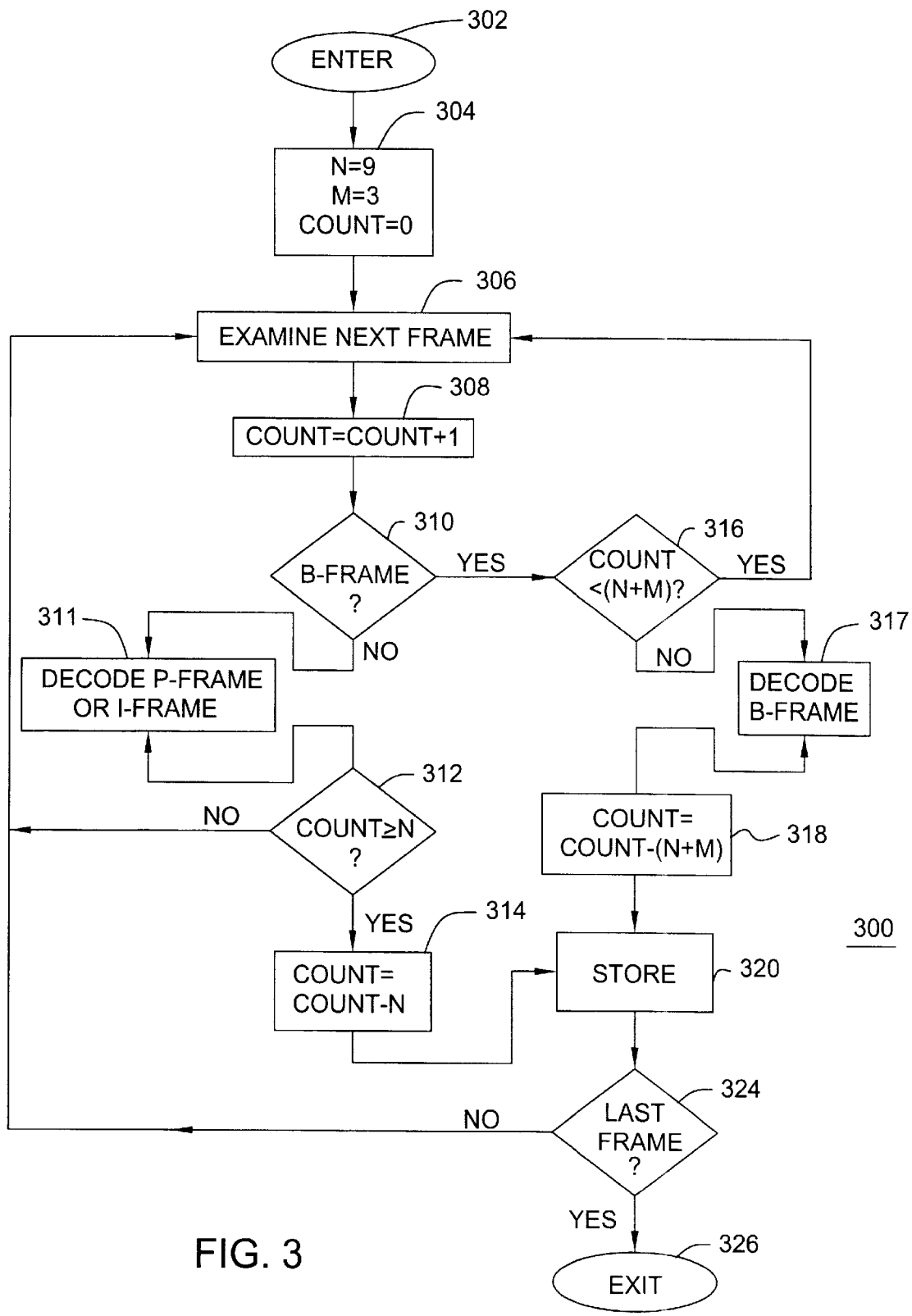
FIG. 3 shows a flow diagram of an information frame selection and decode routine according to the invention and suitable for use in the information sub-stream generating process of FIG. 2 and the information stream processing system of FIG. 1.

FIG. 3 shows a flow diagram 300 of an information frame selection and decode routine according to the invention and suitable for use in the information stream processing routine 200 of FIG. 2, and the information stream processing system FIG. 1. Specifically, the frame selection and decode routine 300 is an information frame selection and decode routine suitable for use in picture processing unit 20. The frame selection and decode routine 300 is intended to couple approximately every Nth information frame within the MPEG-like system stream S1 to MPEG decoder 20.

The frame selection and decode routine 300 is entered at step 302 when picture processor 20 receives, e.g., an initial sequence header indicative of a video frame. At step 304, several variables are initialized. Specifically, a variable N representing a frame "keep rate" is initialized to 9 (i.e., keep every 9th frame); a variable M representing a "keep window" is initialized to 3 (i.e., keep one frame within a three frame window centered on the Nth frame); and a counter variable COUNT is initialized to 0. The keep window M is used to provide a boundary to the keep rate N, thereby reducing jerkiness in the resulting FF/REW information stream. The keep rate N and the keep window M may, of course, be variable or predetermined. The keep rate N and the keep window M may by dynamically adjusted by an operator (or algorithm) in response to a visual quality judgment (or measurement) of the resulting information sub-stream.

After initialization, the routine 300 proceeds to step 306, where the picture header of the next frame in the compressed video information stream S2V is examined. The routine then proceeds to step 308, where COUNTER is incremented, and to step 310, where a query is made as to whether or not the examined frame was a B-frame.

If the query at step 310 is answered negatively, i.e., the frame is an I-frame or a P-frame, then the routine proceeds to step 311, where the I-frame or a P-frame is decoded. The routine 300 then the routine proceeds to step 312, where a query is made as to whether the count is greater than or equal to the keep rate variable N. If the query at step 312 is answered affirmatively, then the frame should be decoded. The routine 300 then proceeds to step 314, where COUNTER is set equal to the present count value minus the decode rate value. If every ninth frame, an exemplary embodiment, is an I-frame or P-frame, then step 14 will always set COUNTER back to zero. If, e.g., the Nth frame was a B-frame, then COUNTER may be greater than N. The routine then proceeds to step 320.

If the query at step 310 is answered affirmatively, i.e., the frame is a B-frame, then the routine 300 proceeds to step 316. At step 316, a query is made as to whether COUNTER is less than the keep rate N plus the keep window M. If the query at step 316 is answered affirmatively (i.e., within the allowable keep window), then the routine proceeds to step 306, where the picture header of the next frame in the compressed video information stream S2V is examined. If the query at step 316 is answered negatively, then the routine proceeds to step 317, where the B-frame is decoded with respect to two I-frames and/or P-frames previously decoded at step 311. The routine 300 then proceeds to step 318, where COUNTER is decremented by the keep rate N plus the keep window M. The routine then proceeds to step 320.

At step 320 the most recently decoded frame is stored and the routine 300 proceeds to step 324, where a query is made as to whether the examined frame is the last frame of, e.g., a video sequence. If the query at step 324 is answered affirmatively, the routine 300 exits at step 326. If the query at step 324 is answered negatively, then the routine 300 then proceeds to step 306, where the picture header of the next frame in the compressed video information stream S2V is examined. The sequence of decoded frames forms the uncompressed digital video sub-stream S5.

In one embodiment of the invention, computational demands are reduced by decoding only those frames that are necessary to produce the FF/REW stream. That is, information frames are stored in a buffer until the counter COUNTER has incremented to a point that cannot possibly use the information of the buffered frame. For example, a buffer capable of storing an entire GOP in a system utilizing fixed GOP sizes may be flushed each time a new GOP is received. In this manner, if a nonpredicted frame (i.e., an I-frame) is the appropriate frame to decode, only one frame is actually decoded. If a predicted frame (i.e., a P-frame or a B-frame) is the appropriate frame to decode, only those frames necessary to decode the predicted frame are actually decoded.

In another embodiment of the invention, computational demands are reduced by decoding and storing only I-frames or P-frames. in this manner, there is not need to decode the two reference frames associated with a B-frame to be decoded, nor is there a need to calculate both forward and backward motion vectors.

However, since it may be the case that a large number of B-frames are received by the picture processing unit 20, B-frames may occasionally need to be decoded to avoid excessive "jerkiness" in the resultant video information sub-stream S5. In the case of a B-frame being decoded, the reference frames used to predict the B-frame must also be decoded.

The need to decode B-frames may be reduced by initially encoding the MPEG-like system stream S1 in a manner that contemplates sub-stream generation. For example, a standard 12 frame group of pictures (GOP) structure used in the ATSC system, when repeated, has the following form (in frame type sequence):

"$I_1B_1B_1P_1B_1B_1P_1B_1B_1P_1B_1B_1I_2B_2B_2P_2B_2B_2P_2B_2B_2$
$P_2B_2B_2I_3B_3 \ldots$"

If every ninth frame is decoded in the above stream, the decoded frame will always be an I-frame or a P-frame (assuming that the first I-frame, $I_1$, is decoded). As previously discussed, keeping every 9th frame results in a FF/REW stream having a frame rate similar to the effective frame rate of a FF or REW operation of a standard VCR. Alternatively, a fast-play mode of operation may be provided by keeping every third frame. In the above GOP structure, every third frame is either an I-frame or a P-frame (assuming that the first I-frame, $I_1$, is decoded). The system of FIG. 1 optionally includes an audio processor 50 that may be used to generate an audio information sub-stream S9. The audio processor 50 receives the compressed audio information stream S2A that is associated with the compressed video information stream S2V coupled to picture processing unit 20. The audio processor 50 also receives the audio processor control signal CA optionally generated by frame decode controller 28. The audio processor 50 utilizes the audio processor control signal CA to identify audio frames or samples associated with the video frames included within video information sub-stream S4. The identified audio frames or samples are coupled to memory unit 60 as optional audio information sub-stream S9. The audio information sub-stream S9 may be a compressed format information stream (e.g., a Dolby AC3 audio stream), such as the compressed audio information stream S2A. Alternatively, the audio information sub-stream S9 may comprise uncompressed audio information stream by decoding the compressed audio information stream S2A using an audio decoder (not shown).

It should be noted that all the elements shown in FIG. 1, with the exception of memory unit 60 and mass storage unit 90, may be implemented entirely or partially in software. This is because the process of generating the information sub-streams to be stored in memory unit 60 and/or and mass storage unit 90 does not necessarily need to be performed in real time. In addition, the computational load on a processor running such a software implementation is greatly reduced when compared to the computational load of prior art methods.

In one embodiment of the invention, MPEG decoder 20 includes a picture parser 24 that parses the compressed video information stream S2V to extract packet header information associated with each frame. In an MPEG-compliant system, the picture header of a video elementary stream includes information identifying the type of compression encoding used to produce a particular information frame (i.e., I-, P- or B-frames). The parsed information frame S3 and a frame-type identification signal T are coupled to a frame decode controller 28. The frame decode controller 28 ideally couples only every Nth frame (and any other frames necessary to decode the Nth frame) to subsequent portions (not shown) of MPEG decoder 20. Thus, compressed video information sub-stream S4 comprises a subsampled version of the original video information stream S2V. Additionally, frame decode controller 28 optionally generates an audio processor control signal CA indicative of a picture frame being coupled to MPEG decoder 40. In this embodiment, the MPEG decoder 40 is used to decode only those information frames necessary to produce, e.g., the fast forward or rewind sub-streams. Thus, the amount of processing is reduced by avoiding decoding of non-essential frames (i.e., those frames not used to produce the Nth frame).

In one embodiment of the invention, memory unit 60 and/or mass storage unit 90 are capable of storing a plurality of compressed and uncompressed video, audio and other information streams. That is, in an embodiment in which one or both of the storage units are present, the one or both storage units may be used to store, e.g., a main information stream and associated information sub-streams such as FF and REW information sub-streams. In the exemplary embodiment of FIG. 1, each uncompressed video information stream represents a high effective frame-rate version of an associated program stream. The associated program stream(s) may also be stored in memory unit 60 and/or mass storage unit 90 as either compressed or uncompressed information streams. The associated program streams are typically stored in a compressed digital format, such as MPEG-1 or MPEG-2. For example, the system of FIG. 1 shows an optional signal path (dotted line) coupling the MPEG-like system stream S1 directly to the memory unit 60 for storage. The stored MPEG-like system stream S1 may be retrieved and coupled to a transport encoder (not shown) as optional main system stream S10. Alternatively, the optional signal path (dotted line) coupling the MPEG-like system stream S1 directly to the memory unit 60 may also be coupled to mass storage unit 90 via signal path S10.

It is important to note that while the invention has been described primarily in terms of hardware, the invention may be implemented using hardware, software or a combination of hardware and software. For example, the invention may be practiced using a computer capable of receiving, processing and storing information streams such as the streams described below with respect to the invention. Moreover, while the invention is described within the context of processing a video information stream (e.g., an MPEG-like stream) to produce a video information sub-stream (i.e., a fast-forward or fast-rewind video information stream), the invention may be practiced using other types of information streams and for other purposes. For example, information sub-streams generated according to the invention at multiple locations may be compared to verify or authenticate information streams transmitted between the multiple locations.

The above-described invention provides rapid, cost-effective generation of information sub-streams. In the context of the OnSet™ interactive digital video on demand (VOD) service, the invention is used to process a large amount of content, such as movies, sporting events and the like. By contemporaneously providing FF and REW streams along with an associated main information stream, the OnSet™ system allows a subscriber to rapidly switch between streams. While the invention is advantageously employed within the context of a video on demand system, such as the previously-described OnSet™ interactive digital video on demand (VOD) service, other information processing and distribution systems may benefit from the invention.

Although various embodiments which incorporate the teachings of the present invention have been shown and described in detail herein, those skilled in the art can readily devise many other varied embodiments that still incorporate these teachings.

What is claimed is:

1. A method for processing a compressed information stream to produce one or more compressed information sub-streams, said method comprising the steps of:
   (a) identifying an Nth compressed information frame in said compressed information stream, where N is an integer greater than one;
   (b) decoding said identified Nth compressed information frame to produce an uncompressed information frame;
   (c) storing, in a memory, said uncompressed information frame;
   (d) repeating steps (1), (2) and (3) until a plurality of said Nth compressed information frames in said compressed information stream has been processed and stored to form a stored uncompressed information sub-stream;
   (e) retrieving, from said memory, said stored uncompressed information sub-stream; and
   (f) encoding, using a compression encoder, said retrieved uncompressed information frames to produce an encoded information sub-stream.

2. The method of claim 1, wherein:
   in a fast-forward (FF) mode of operation, said stored uncompressed information sub-stream is retrieved in a standard temporal order and encoded to produce an encoded FF information sub-stream; and
   in a fast-rewind (REW) mode of operation, said stored uncompressed information sub-stream is retrieved in a reverse temporal order and encoded to produce an encoded REW information sub-stream.

3. The method of claim 2, further comprising the step of:
   storing, in said fast-forward (FF) mode of operation and said fast-rewind (REW) mode of operation, respectively, said encoded FF information sub-stream and said encoded REW information sub-stream in a mass storage unit.

4. The method of claim 1, wherein said step of identifying further comprises the step of:
   determining if said identified information frame is a non-predicted information frame or a predicted information frame; and
   in the case of said identified information frame being a predicted information frame of a first type:
      examining each of up to M compressed information frames subsequent or prior to said identified information frame to identify a one compressed information frame that is not a predicted information frame of said first type, where M is an integer; and
      substituting, for decoding purposes, said identified one information frame for said identified information frame.

5. The method of claim 4, wherein said information stream comprises an MPEG-like information stream, and said first type of information frame comprises a bi-directionally predicted frame.

6. The method of claim 1, wherein said step of identifying further comprises the step of:

determining if said identified information frame is a non-bidirectionally predicted information frame or a predicted information frame; and in the case of said identified information frame being a bidirectionally predicted information frame of a first type:

examining each of up to M compressed information frames subsequent or prior to said identified information frame to identity a one compressed information frame that is not a bidirectionally predicted information frame of said first type, where M is an integer; and substituting, for decoding purposes, said identified one information frame for said identified information frame.

7. A method for generating an information sub-stream, said method comprising the steps of:

(a) identifying an Nth compressed information frame in an information stream comprising a plurality of compressed information frames, where N is an integer greater than one;

(b) decoding said identified Nth compressed information frame to produce an uncompressed information frame;

(c) storing, in a memory, said uncompressed information frame; and (d) repeating steps (a) through (c) until each of said Nth compressed information frames in said received information stream has been processed.

8. The method of claim 7, wherein said step of identifying further comprises the step of:

determining if said identified information frame is a non-predicted information frame or a predicted information frame; and in the case of said identified information frame being a predicted information frame of a first type:

examining each of up to M compressed information frames subsequent or prior to said identified information frame to identify a one compressed information frame that is not a predicted information frame of said first type, where M is an integer; and substituting, for decoding purposes, said identified one information frame for said identified information frame.

9. The method of claim 8, wherein said information stream comprises an MPEG-like information stream, and said first type of information frame comprises a backward predicted frame.

10. The method of claim 7, further comprising the steps of:

(e) retrieving, from said memory, said stored uncompressed information frames; and (f) encoding, using a compression encoder, said retrieved uncompressed information frames to produce an encoded information sub-stream.

11. The method of claim 10, wherein:

in a fast-forward (FF) mode of operation, said stored uncompressed information frames are retrieved in a standard temporal order and encoded to produce an encoded FF information sub-stream; and in a fast-rewind (REW) mode of operation, said stored uncompressed information frames are retrieved in a reverse temporal order and encoded to produce an encoded REW information sub-stream.

12. The method of claim 11, further comprising the step of:

storing, in said fast-forward (FF) mode of operation and said fast-rewind (REW) mode of operation, respectively, said encoded FF information sub-stream and said encoded REW information sub-stream in a mass storage unit.

13. The method of claim 12, wherein said information stream comprising a plurality of compressed information frames is stored in the same mass storage unit as said encoded FF information sub-stream and said encoded REW information sub-stream.

14. The method of claim 7, wherein said information sub-stream comprises a fast-forward video information stream.

15. Apparatus for processing an information stream to produce an information sub-stream, said information stream comprising a plurality of compressed information frames, said apparatus comprising:

a decoder, for decoding said information frames coupled to said frame controller output and producing a frame-decoded information stream therefrom;

said decoder further comprising:

a parser, for examining a header portion of at least every Nth compressed information frame in said information stream, and for generating an indicium of a compression type associated with said examined frame; and a frame controller, coupled to said parser, for causing the decoding of every Nth information frame if said Nth information frame is of a desired compression type, where N is an integer greater than one.

16. The apparatus of claim 15, wherein:

said frame controller, in response to said Nth information frame being of a non-desired compression type, decodes a first information frame of a desired compression type proximally located within M information frames of said Nth information frame, where M is an integer.

17. The apparatus of claim 16, wherein:

said frame controller, in response to said Nth information frame and said proximally located M information frames being of a non-desired compression type, decoding said Mth information frame following said Nth information frame.

18. The apparatus of claim 15, further comprising a storage unit, coupled to said decoder, for storing said frame-decoded information stream.

19. The apparatus of claim 18, wherein said storage unit, in response to one or more control signals, selects for access one of a plurality of stored frame-decoded information streams, accesses said one selected stream at a desired location within said one selected stream, and sequentially couples to an output an information frame corresponding to said desired location and a plurality of information frames either preceding or succeeding information frames.

20. The apparatus of claim 15, wherein said information stream comprises an MPEG-like video information stream having a first effective video frame rate, and said frame-decoded information stream comprises a video information stream having a second effective video frame rate, said second video frame rate being approximately N times greater than said first video frame rate.

* * * * *